3,281,502
PHOSPHORUS ACID-HALOHYDRIN COMPOUNDS
Paul E. Pelletier, Elmwood Park, and Floy Pelletier, Lockport, Ill., assignors, by mesne assignments, to Wyandotte Chemicals Corporation, a corporation of Michigan
No Drawing. Filed May 22, 1959, Ser. No. 814,967
5 Claims. (Cl. 260—920)

The present invention relates to halohydrin compounds produced by reaction of a phosphorus acid with a halogen substituted aliphatic monoepoxide, these halohydrin compounds possessing various utility, particularly as intermediates for the production of synthetic resins possessing improved resistance to burning and flame propagation. The halohydrin compounds of the invention are of outstanding utility when reacted with polyisocyanates to produce polyurethane resins, especially when the reaction takes place in the presence of water or other blowing agent to produce polyurethane foams characterized by non-inflammability and the capacity to self-extinguish fires. The halohydrin compounds are also of value when reacted with polycarboxylic acids to form polyesters and these halohydrin compounds also provide a source of new epoxy resins.

In accordance with the invention, a phosphorus acid, such as orthophosphoric acid, is reacted with a halogen-substituted aliphatic monoepoxide, such as epichlorohydrin, to provide halohydrin compounds and preferably at least substantially neutral halohydrin compounds.

Various phosphorus acids may be used, orthophosphoric acid being preferred. Pyrophosphoric acid and phosphorous acid also produce good results. Metaphosphoric acid as well as partial esters of the polyhydroxy phosphorus acids such as the mono- and di-esters of orthophosphoric acid, the mono-esters of phosphorous acid, and the mono-, di- and tri-esters of pyrophosphoric acid, such as dimethyl acid pyrophosphate and ethyl acid phosphate, are also usable in the invention.

It is preferred to employ the selected phosphorus acid or mixture of acids in the absence of free water since water is independently reactive with the halogen-substituted monoepoxide so long as the reaction mixture is sufficiently acidic. However, the invention includes the presence of water in the reaction mixture as well as the presence of water or water-epoxide reaction product in the final product which is produced.

The halogen-substituted aliphatic monoepoxides which are preferred in accordance with the invention have the formula:

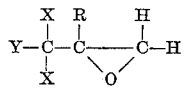

in which X is selected from the group consisting of hydrogen, halogen and organic hydrocarbon radicals, Y is a halogen and R is selected from the group consisting of hydrogen and organic hydrocarbon radicals.

The preferred epoxide is epichlorohydrin. Other epoxides which may be used are illustrated by trichloromethylethylene oxide, α-methyl epichlorohydrin, epiiodohydrin, epifluorohydrin, epibromohydrin, β-heptylepichlorohydrin, α-cyclohexylepichlorohydrin, β-phenylepibromohydrin, and α-allylepichlorohydrin.

It is known as taught, for example, in United States Patent 2,372,244, to react phosphoric or phosphorous acids with olefin oxides to produce reaction products possessing primary hydroxyl groups as indicated by the reaction equations set forth in said patent.

The products of the invention are very different from those of Patent 2,372,244 since when sufficient propylene oxide is reacted with phosphoric acid or phosphorous acid (about 6 mols per mol of acid) to produce a neutral product sufficiently reactable with polyisocyanates for polyurethane foam production, the foam product is not self-extinguishing or non-inflammable. Using epichlorohydrin in accordance with the invention to provide a halohydrin compound containing both hydroxyl groups and chlorine substitutents enables the provision of at least substantially neutral products which are reactive with polyisocyanates to form non-inflammable and self-extinguishing polyurethane foams.

At least 1 mol of halogen-substituted monoepoxide is reacted with each mol of phosphorous acid and, in accordance with the preferred practice of the invention, sufficient total aliphatic monoepoxide (halogen-substituted or not) is reacted with the phosphorus acid to provide an at least substantially neutral halohydrin compound. Thus, and using orthophosphoric acid as illustrative, the reaction of about 5 or more mols of epichlorohydrin with orthophosphoric acid produces a neutral halohydrin compound reactable with polyisocyanates to provide a satisfactory self-extinguishing polyurethane foam. When from 1 to about 4 mols of epichlorohydrin is reacted, the polyurethane foam does not possess the superior physical characteristics provided when about 5 or more mols of epichlorohydrin are used, but the foam product is self-extinguishing. However, reacting 3 mols of epichlorohydrin with 1 mol of orthophosphoric acid followed by reacting 3 mols of an olefin oxide such as ethylene oxide, propylene oxide, 1,2-butylene oxide or any monoepoxide compound having the 1,2 oxirane group, such as styrene oxide, with the initial acidic epichlorohydrin-phosphoric acid reaction product provides a chlorohydrin compound which will yield a satisfactory self-extinguishing polyurethane foam of superior physical characteristics.

The chlorohydrin compounds of the invention may be used alone for reaction with polyisocyanates or in admixture with other compounds reactable therewith such as hydroxyl-containing polyesters and polyethers. Whatever proportions of the chlorohydrin compounds of the invention are used in the mixture provides an improvement in fire resistance, and it is preferred to use enough to provide self-extinguishing character to the foam product.

The halohydrin compounds of the invention are adapted to diverse other utility in addition to the utility illustrated above with reference to production of polyurethane foam products of improved flame resistance. Thus, the polyurethane product need not be foamed providing various rubbers, coatings and textile treating agents as is known to the art. Also the halohydrin compounds may be used as a source of organic polyhydroxy compound for reaction with polycarboxylic acids such as maleic or fumaric acids or anhydrides to provide polyesters. Further, the halohydrin compounds of the invention may be partially or completely dehydrohalogenated to produce epoxy resins. A number of alkaline materials may be used for the dehydrohalogenating treatment with varying degrees of efficiency. Various suitable dehydrohalogenating agents include sodium hydroxide and basic reacting metal salts of strong bases and weak acids such as the hydroxides and oxides of magnesium, zinc, lead, iron and aluminum as well as various aluminates, silicates and zincates, as disclosed in United States Patent 2,581,464 may be used to effect the desired dehydrohalogenation. Representative dehydrohalogenation agents which are preferred are aluminates of alkali metals, such as $Na_3AlO_3$, $Na_2AlO_4$, $Na_2Al_2O \cdot xH_2O$ (where $x$ represents the quantity of associated water), $K_2Al_2O_4$; zincates of alkali metals, principally sodium and potassium, and silicates of alkali metals, either anhydrous or hydrated orthosilicates, metasilicates, disilicates, trisilicates, sesquisilicates, etc. Typical of such materials are $Na_2SiO_3.5H_2O$, $3Na_2.2SiO_2.5H_2O$, $Na_4SiO_4$ and $Na_2SiO_3$.

Dehydrohalogenation can be effected in either aqueous or non-aqueous medium, temperatures in the range of 70–105° C. being particularly preferred for the dehydrohalogenation reaction.

Thus, the various halohydrin compounds which may be produced in accordance with the invention may be dehydrohalogenated to form epoxy resins which may be used as such, or upgraded by reaction with a dihydric organic compound such as bisphenol A, or employed in admixture with conventional epoxy resins such as those produced by reaction of epichlorohydrin with polyhydric organic compounds, notably bisphenol A, followed by dehydrohalogenation of the polyhalohydrin ethers so produced to form polyglycidyl ethers. The epoxy resins which can be formed from the phosphorus-containing halohydrin compounds of the invention are curable to form films, coatings, molded products, etc., by employing conventional epoxy resin curing agents known to the art. These are illustrated by basic curing agents which are preferably polyamines, e.g., triethylene tetramine, or acid curing agents such as phthalic acid, or Friedel-Crafts catalysts which are preferably illustrated by boron trifluoride etherate, etc.

Referring to the production of the phosphorus-containing halohydrin compounds of the invention, the temperature of reaction can vary from 50° F. to 500° F. Low temperature operation, while possible, is inconvenient because the reaction is exothermic. At temperatures above 220° F., the product darkens and is less desirable, though still useful. Preferred temperatures are from 140°–190° F., providing an easily controlled reaction without darkening of the product. For convenience, atmospheric pressure is used, but this is not essential. When operating at temperatures above the boiling point of the reactants, the use of pressure is necessary and permissible, e.g., above 243° F. for epichlorohydrin.

The reaction is preferably effected by incremental addition of the substituted monoepoxide to the hot phosphorus acid, though this is not essential, the rate of addition being established by the cooling efficiency available and the reaction temperature desired.

The invention is illustrated in the following examples:

EXAMPLE I 17.85 mols of epichlorohydrin were added to 3.56 mols of 100% orthophosphoric acid in a 2 liter, 3 neck flask provided with a reflux condenser and agitating means, the flask being set up in a cooling bath. A reaction temperature of 160–180° F. was maintained during addition of the epichlorohydrin. The reaction temperature was maintained at the initial stages of reaction by water cooling. After addition of epichlorohydrin, the product was held at 200° F. for 2 hours to complete the reaction. The product was then heated in an inert atmosphere under vacuum to remove any remaining epichlorohydrin. A nearly quantative yield of 1995 grams was obtained. The product is a clear, slightly yellow liquid, essentially neutral on titration with sodium hydroxide. The product is insoluble in water, but soluble in methyl and isopropyl alcohol and has a hydroxyl number of 300 which corresponds with the combination of 5 mols of epichlorohydrin per mol of orthophosphoric acid.

EXAMPLE II 7.98 mols of epichlorohydrin were added to 2.66 mols of 100% orthophosphoric acid, the reaction conditions being the same as those specified in Example I. The product was then held at 180° F. for 1 hour to complete the reaction. A quantative yield of 1000 grams was obtained. The product is a clear, slightly yellow liquid having a pH of 1.5, insoluble in water but soluble in ethyl alcohol.

EXAMPLE III

To the product of Example II, 450 grams of ethylene oxide were added under a pressure of 10–30 centimeters of mercury, and the reaction temperature was maintained at 90–120° F. by means of water cooling. After addition of ethylene oxide, the reaction temperature was increased slowly to 170° F., and this reaction temperature was maintained for 1½ hours. Vacuum was then applied to remove free oxide. The final yield was 1425 grams of a clear, faintly yellow colored liquid product which was free of acid and possessed a hydroxyl number of 290 (acetylation method).

EXAMPLE IV

A typical foaming composition was prepared using the halohydrin compound obtained in Example I as follows:

*Quasi prepolymer composition*

| | Parts |
|---|---|
| Halohydrin compound of Example I | 14.5 |
| Tolylene diisocyanate (80/20 mixture of the 2,4 and 2,6 isomers) | 58.00 |
| (React at 200° F. for 1 hour—Cool to 70° F. and cap in moisture free container—Viscosity at 80° F.—cps. Analyzed NCO—32.) | |
| Freon 11 (blowing agent) | 27.5 |

*Resin-accelerator composition*

| | |
|---|---|
| Halohydrin compound of Example I (phosphoric epichlorohydrin adduct) | 99.2–96.7 |
| Triethyl amine | .3–1.8 |
| Wetting agent—silicone V–520 (Union Carbide & Carbon) | .5–1.5 |

*Foaming composition*

| | Parts |
|---|---|
| Quasi prepolymer | 54.4 |
| Resin-accelerator mixture | 45.6 |

The composition set forth above produces a very fine celled, brittle foam which is completely non-inflammable. The product possesses only limited tensile strength and load-bearing properties.

It has been found that if 85 to 40 parts of the halohydrin compound of Example I are mixed with 15 to 60 parts of a typical polyester, or polyether having a hydroxyl number in the range of 250 to 700, the preferred hydroxyl number being from 450 to 480, non-burning foams of improved physical properties can be produced. Suitable polyesters are illustrated by the reaction product of adipic acid and ethylene glycol and suitable polyethers are illustrated by high molecular weight epoxy resins. A typical example is as follows:

EXAMPLE V

*Resin-catalyst mixture*

| | |
|---|---|
| Halohydrin compound of Example I | 49.25 |
| Adipic acid-ethylene glycol polyester (hydroxyl number 480) | 49.25 |
| Triethyl amine | .7 |
| Wetting agent—silicone X–520 (Union Carbide & Carbon) | .8 |

*Foam composition*

| | Parts |
|---|---|
| Quasi prepolymer of Example IV | 54.4 |
| Resin catalyst mixture of this example | 45.6 |

The foam produced is a self-extinguishing, fine celled, tough, rigid material. The load bearing properties, tensile strength and shear strength are vastly superior to the foam produced in Example IV.

EXAMPLE VI

Examples IV and V were repeated using the halohydrin compound of Example II instead of the halohydrin compound of Example I. The foaming reaction did not run as smoothly as it did in Examples IV and V, but self-extinguishing foams were produced although the fine cell structure and uniform physical properties achieved in Examples IV and V were not duplicated, and the self-extinguishing character of the Example IV and V products was superior to those produced in the present example.

EXAMPLE VII

Examples IV and V were repeated using the halohydrin compound produced in Example III. Results approximately corresponding to those produced in Examples IV and V were achieved although the self-extinguishing character of the foam products produced in Examples IV and V were somewhat superior to those produced by the present example.

Whereas orthophosphoric acid has been used as illustrative in the examples set forth, the various other phosphorus acids referred to may be substituted for the orthophosphoric acid of the examples by employing an equivalent weight of the selected phosphorus acid based on the hydroxy groups in the phosphorus acid molecule. Further, the example employs orthophosphoric acid in the absence of water, and this is preferred. However, water may be tolerated, preferably but not necessarily in an amount not exceeding the weight of phosphorus acid present in the reaction mixture.

It will be understoood that the production of polyurethane foam may be accomplished in various ways known to the art, the foam production illustrated in Examples IV, V, VI and VII being simply illustrative. In this regard, reference is made to the text entitled "Polyurethanes" by Bernard A. Dombrow, published by Reinhold Publishing Corporation, 1957, where reference is made to various techniques for the production of polyurethane foams, including the "one-shot" procedure as well as various procedures including polyurethane prepolymers.

As is conventional, the foaming composition includes a blowing agent. This term includes various types of materials which are known to possess an expanding function. Thus, water reacts with isocyanate to produce carbon dioxide gas thereby providing a blowing agent which enters into the polymerization reaction providing an internal blowing agent. External blowing agents which expand or decompose to yield gaseous products, normally upon increase in temperature, may also be used. These are termed external agents because they do not enter into the isocyanate polymerization reaction. External blowing agents are illustrated by the materials generally known as freons which are lower molecular weight hydrocarbons usually containing both fluorine and chlorine substituents. Other external blowing agents are illustrated by sodium and ammonium bicarbonate, etc.

As is generally accepted in the urethane art when preparing a foam, the equivalents of isocyanate are preferably approximately equal to the equivalents of hydroxyls (or other radicals) designed to react with the isocyanate to produce the urethane polymer. The ratio of isocyanate to hydroxyl can vary considerably in accordance with the invention in the same manner as is known for the conventional hydroxyl-containing materials known to the art.

Any isocyanate will react with the halohydrin compounds of the invention such as tolylene diisocyanate (pure or mixed isomers), hexamethylene diisocyanate, 1,5 naphthalene diisocyanate, methylene bis-4-phenyl isocyanate, etc., however the preferred isocyanates are the various commercial tolylene diisocyanates because of their availability and desirable physical properties which are well understood by the art.

The invention is defined in the claims which follow.

We claim:

1. The substantially neutral halohydrin reaction product of at least 5 mols of monoepoxide with 1 mol of a phosphorus acid, at least 3 mols of said monoepoxide being a halogenated monoepoxide selected from the group consisting of epihalohydrin, lower alkyl-substituted epihalohydrin, phenyl-substituted epihalohydrin and halogen-substituted epihalohydrin, any remainder of said monoepoxide being an oxide selected from the group consisting of ethylene oxide, propylene oxide, 1,2-butylene oxide and styrene oxide.

2. The halohydrin reaction product recited in claim 1 in which said halogenated monoepoxide is epichlorohydrin.

3. The substantially neutral halohydrin reaction product of at least 5 mols of aliphatic monoepoxide with 1 mol of a member selected from the group consisting of orthophosphoric acid, pyrophosphoric acid, metaphosphoric acid, phosphorous acid, dimethyl acid pyrophosphate and ethyl acid phosphate, at least 3 mols of said monoepoxide being a halogenated monoepoxide selected from the group consisting of epihalohydrin, lower alkyl-substituted epihalohydrin, phenyl-substituted epihalohydrin and halogen-substituted epihalohydrin and any remainder of said monoepoxide being an oxide selected from the group consisting of ethylene oxide, propylene oxide, 1,2-butylene oxide and styrene oxide.

4. The at least substantially neutral halohydrin reaction product of at least 5 mols of epichlorohydrin with 1 mol of orthophosphoric acid.

5. The neutral reaction product of 1 mole of orthophosphoric acid with at least 5 moles of a monoepoxide selected from the group consisting of epihalohydrin and lower alkyl-substituted epihalohydrin.

References Cited by the Examiner

Pudovik et al.: Bull. Acad. Sci., USSR, "Div. Chem. Sci." (English translation), 1952, 837–42.

Stockx et al.: Bull. Soc. Chim. Belges 65, 6928–36 (1956).

Zetzsche et al.: Helv. Chim. Acta 9, 708–714 (1926).

Stiles et al.: J. Am. Chem. Soc., 80, 714–716 (1958).

CHARLES B. PARKER, *Primary Examiner.*

ABRAHAM H. WINKLESTEIN, MORRIS LIEBMAN,
*Examiners.*

D. D. HORWITZ, F. M. SIKORA, J. P. BRUST,
*Assistant Examiners.*